United States Patent
Armstrong et al.

[15] 3,635,619
[45] Jan. 18, 1972

[54] ELECTRICALLY HEATED COMPOUND MOLDING MACHINE

[72] Inventors: Thaddeus J. Armstrong, Elmwood Park; Jon Ohlhaver, Deerfield, both of Ill.

[73] Assignee: Continental Can Company, Inc., New York, N.Y.

[22] Filed: Mar. 24, 1969

[21] Appl. No.: 809,898

[52] U.S. Cl. ............................................. 425/112, 425/144
[51] Int. Cl. ................................................. B29c 3/02
[58] Field of Search .............. 18/20 C, 20 G, 20 R, DIG. 13, 18/5 R, 38, 5 BH, 12 SJ, 5 E, 5.3 H, 30 HB, 16.5; 249/78; 136/200, 201, 230

[56] References Cited

UNITED STATES PATENTS

| | | | |
|---|---|---|---|
| 1,356,714 | 10/1920 | Hachmann | 249/78 X |
| 2,338,691 | 1/1944 | Tucker | 18/30 HB X |
| 2,565,063 | 8/1951 | Briscoe et al. | 18/DIG. 13 |
| 2,719,326 | 10/1955 | Dykehouse | 18/30 HM |
| 2,774,107 | 12/1956 | Davis | 18/12 SJ |
| 3,050,575 | 8/1962 | Sullivan | 136/230 |
| 3,407,442 | 10/1968 | Wright | 18/20 G |
| 1,541,358 | 6/1935 | Johnson | 18/16.5 UX |
| 2,508,988 | 5/1950 | Bradley | 18/30 HB X |

FOREIGN PATENTS OR APPLICATIONS

| | | | |
|---|---|---|---|
| 1,141,422 | 12/1962 | Germany | 18/20 C |

*Primary Examiner*—H. A. Kilby, Jr.
*Attorney*—Americus Mitchell, Joseph E. Kerwin and William A. Dittmann

[57] ABSTRACT

An electrically heated compound molding machine for molding cap liners in place. The machine has an electrically heated ring for controlling the temperature of an upper die element within narrow limits. The particular thermostat control element limits the upper die temperature to within narrow confines. Radiant heat is used to heat the lower die members.

10 Claims, 11 Drawing Figures

PATENTED JAN 18 1972 3,635,619

INVENTORS
THADDEUS J. ARMSTRONG
JON OHLHAVER

BY *American Mitchell* ATT'Y.

PATENTED JAN 18 1972 3,635,619

INVENTORS
THADDEUS J. ARMSTRONG
JON OHLHAVER
BY *American Mitchell* ATT'Y.

ELECTRICALLY HEATED COMPOUND MOLDING MACHINE

This invention relates to the forming or molding of plastic materials, and more particularly, to improvements in a heated molding machine for in-place molding of resin compositions, such as the thermosetting materials used as an inner liner for a container closure cap or a similar article to provide a resilient gasket for the seal between the closure cap and the bottle, jar or the like.

This apparatus is essentially an improvement of the apparatus embodied in the patent application entitled "Machine for In-Place Molding of Cap Gaskets," by Norbert L. Wright, U.S. Pat. No. 3,407,442, and assigned to the assignee of the present invention.

It is a general object of the present invention to simplify and improve the construction and operation of the machine referred to in the above patent.

It is another object of the invention to provide a machine having fewer elements.

It is another object of the invention to provide a machine having a quick startup time.

It is another object of the invention to provide a machine having excellent heat-transfer characteristics and responsive heat control.

It is a final object of my invention to provide a machine having easier disassembly and access for repair.

These and other objects and advantages of the invention will become apparent from a consideration of the molding machine which is shown by way of illustration in the accompanying drawings and more clearly understood by reference to the following detailed description wherein:

FIG. 11 shows the fragmentary section to an enlarged scale through the skirt of a cap shell prior to the molding operation.

FIG. 12 is a view similar to FIG. 11 after the molding operation and the plastic is in its final position.

As described in the accompanying figures, this device is, in most essentials, very similar in its operation and structure to the device referred to in the above-mentioned patent to N. L. Wright, U.S. Pat. No. 3,407,442.

Figure 1:
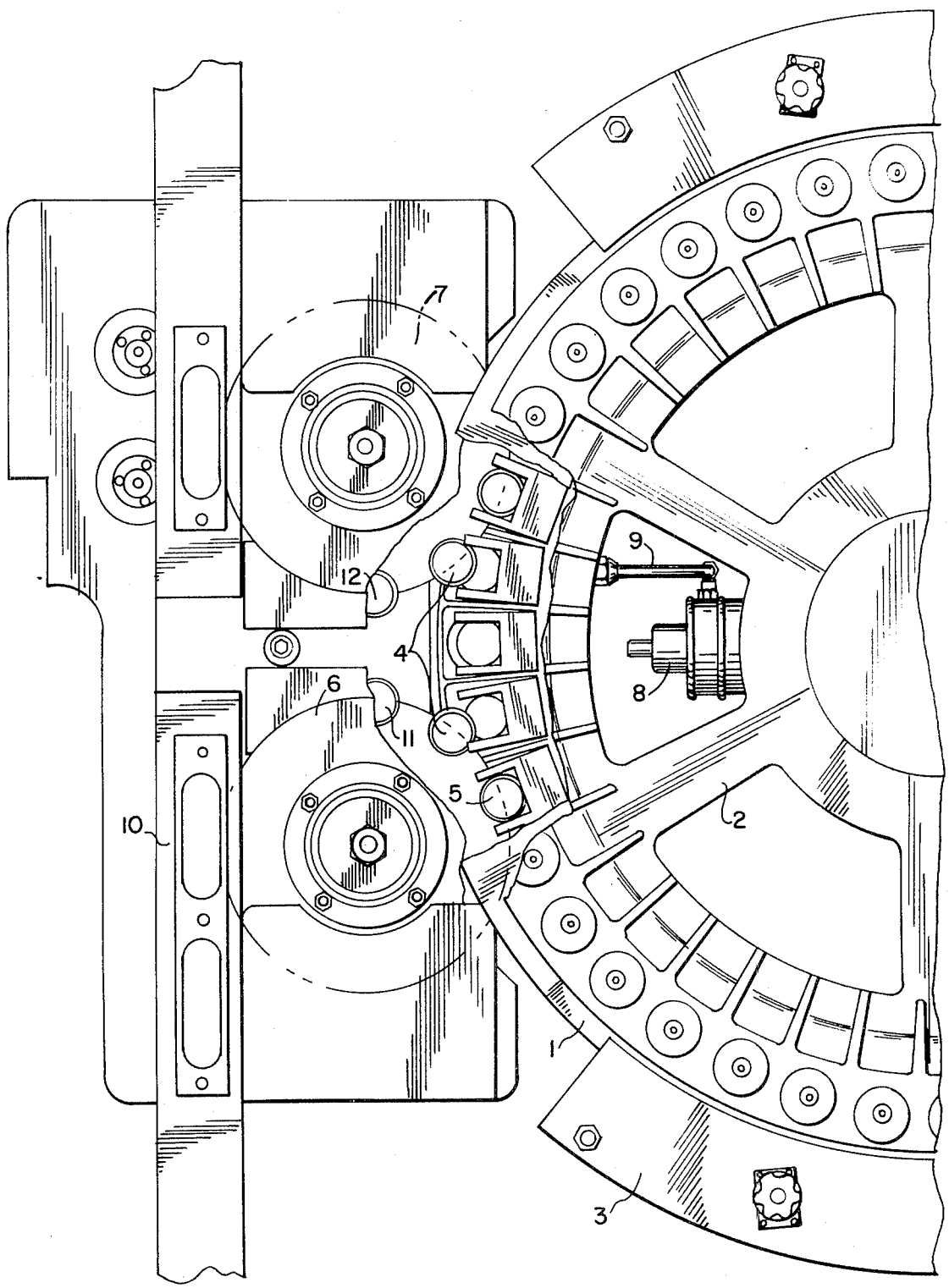
FIG. 1 is a plan view of my machine for molding cap liners having portions of the machine broken away for a clearer view.

FIG. 1 shows the upper heater ring 1 underneath the turret 2. This upper electrical heater ring is attached to the turret and rotates with the turret. An appropriate number of slip rings are mounted on the axis of the turret and cooperating rings. In this way, power is supplied to the electric heater. The cover 3 is shown surrounding about three-fourths of the turret 2 which rotates inside the cover 3. Part of the turret is broken away to show caps 4 being passed into and out of the turret. These caps 4 are fed from a wheel pocket 5 in the wheel turret 6 and after having been processed, are taken away by another wheel turret 7 for further operations. The spindle operating elements of the individual stations of the turret are lubricated by a pump 8 shown interiorly of the turret and oil is conducted through a lubricant supply line 9 to the necessary points on the turret. A belt 10 or similar conveyance brings unprocessed caps 11 to the machine and takes the processed caps 12 from the machine.

Figure 2:
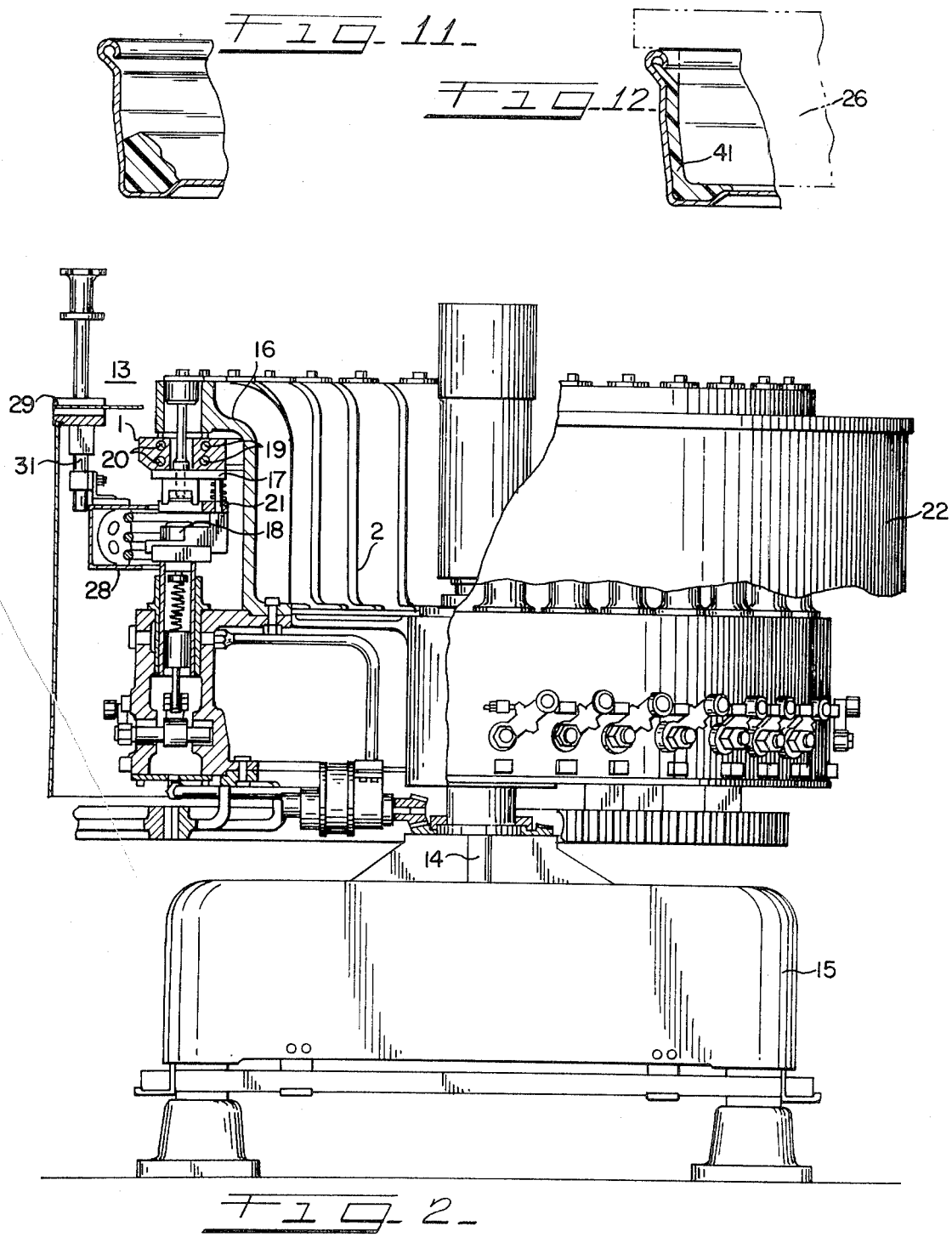
FIG. 2 is a side elevation of my machine with portions broken away.

A cross section view of the machine is shown in FIG. 2. A cross section of one of the stations 13 in side elevation shows most of the moving parts. The turret 2 is rotatably mounted on a shaft 14 which extends from the center of the base machine 15 upwardly. The turret has a shape somewhat similar to a bowl having a lip 16 around its upper rim.

Suspended from the upper lip 16 is shown a cross section of the upper heater ring 1 which is hung beneath the outer section of the turret. The heater ring 1 extends completely around the turret 2 and the temperature of the heater ring is controlled by the amount of electricity fed into the ring in response to the temperature of the upper molding die 26 and to a lesser extent, the cap and lower punch assembly 18. Two pairs of heater elements 19, 20 extend completely around the ring. These heater elements are connected to an external power source through slip rings. The amount of electricity conducted to and through the electric heater is controlled by a thermostat which responds to the level of the temperature in the molding die or punch 21. When the temperature of the thermostat is above a certain level, the thermostat stops the flow of electricity to the upper heater ring 1 and when the temperature of the thermostat is below a certain level, the thermostat starts the flow of electricity to heat the upper heater ring 1 until the thermostat cutoff works as described above.

A thermostat, not shown, regulates the temperature of the lower clamping lifting member to about the same temperature as the punch. This assembly radiates heat to the lower clamp assembly, thereby keeping it at a temperature near the curing point of the plastic being used in the caps.

As shown in the drawing, the entire area may be covered by a shield 22 to protect against flying debris, dust and air currents.

Figure 3:
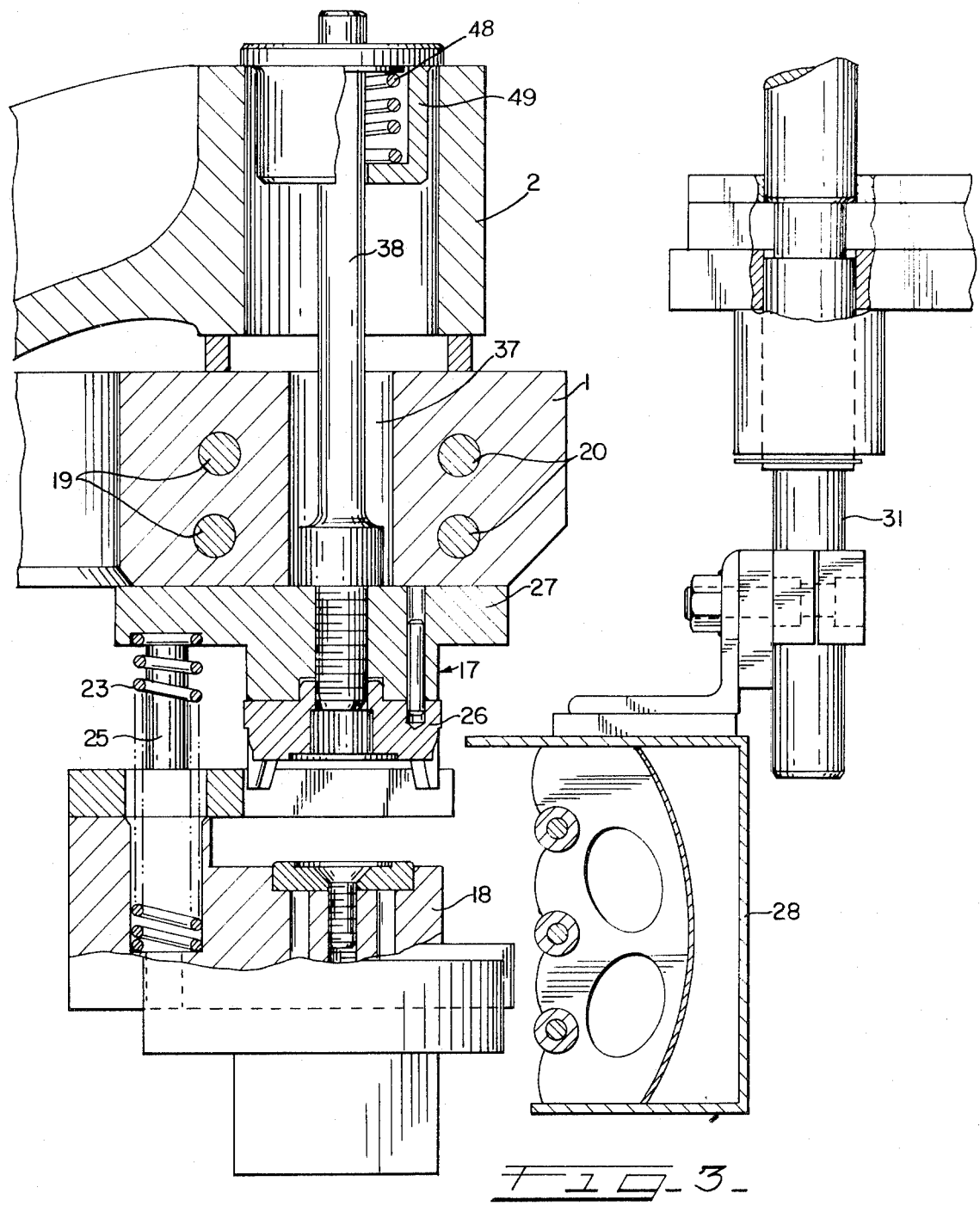
FIG. 3 is a partial vertical section to an enlarged scale of an upper and lower clamp member and the lower heater assembly taken from the opposite side as FIG. 2.

Turning now to a closer view of the upper and lower punch assemblies 17, 18, from a different view, FIG. 3 shows the lower punch assembly 18 and an upper punch assembly 17 having a single compression spring 23 with two paired pins 24, 25 slidable between the punch assemblies 17, 18 to keep proper orientation and distance between the assemblies so that the punch assembly or die punch 26 enters the cap at a proper place to press down the plastic material located around the inside of the cap. The compression spring 23 imparts an upward force to the upper heat transfer element 27. Above the die or punch 26 is shown the upper thermal transfer element 27 which operates as a heat sink since it is of a much more dense material than the heater ring 1. In this way, as heat is extracted from the die or punch and passed into the ambient atmosphere and the plastic material and the cap material, this heat will momentarily lower the temperature of the die or punch 26 somewhat, but whatever heat is lost is quickly restored by the upper thermal transfer element 27 which has a high heat capacity. The rate of heat flow through the upper thermal heat-transfer element 27 is relatively slow in comparison to the rate of heat transferred through the heater ring 1. The heater ring is made of a material having a high heat-transfer capacity, such as aluminum. In this way, when electric potential is applied to the resistors 19, 20 in the heater ring, the temperature of the resistors will rise rapidly and this heat is transmitted to the ring material. The ring is made of a material having a high rate of heat conductivity, such as aluminum. From the heater ring, heat is passed into the upper thermal transfer element.

The upper thermal transfer element 27 is made of a material having the characteristics of high heat capacity per cubic centimeter and a relatively low rate of heat conductivity, for example, steel. Because of these two characteristics, it acts as a heat sink or thermal storage place. The heat sink provides a buffer and a heat-equalizing region so that the heat supplied by the heater ring on one side and the heat flowing out of the punch on the other side do not cause wide swings in the overall temperature of the upper punch assembly. Heat travels about six times as fast in aluminum as in the upper steel heat transfer element.

The lower forming assembly is controlled in about the same manner as the upper assembly in that one or more thermostats are located around its periphery and as the upper turret turns, the lower assembly is heated by heater elements located in the lower heater assembly 28. A thermostat (not shown) located at the lower assembly calls for more or less heat as the situation demands, and keeps the lower assembly within a temperature range of 10° to 15° of about 425° F., depending on the plastic heat-curable material used for the gasket.

Figure 4:
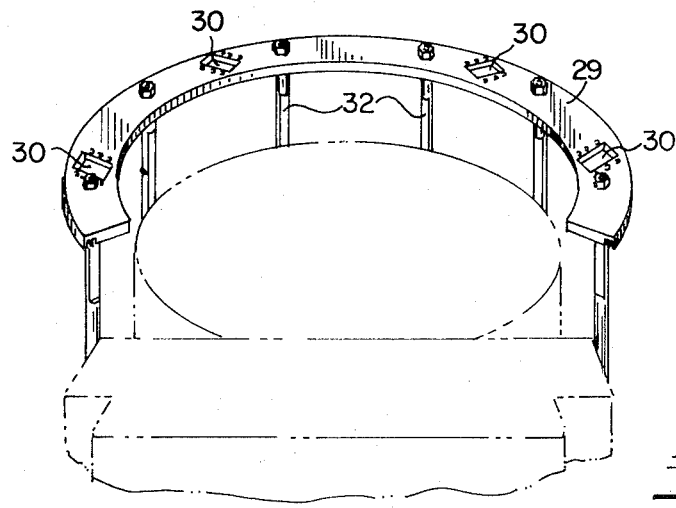
FIG. 4 shows a part of my machine showing the ring support member.

Shown in FIG. 4 is a plan view of details of the heater support ring 29 found in FIGS. 1 to 3, inclusive. This support ring 29 has diagonal slots 30 in it so that the lower heater supporting elements 31 (FIGS. 2 and 3) are mounted in these diagonal slots 30 and may be moved from a position of about one-sixteenth inch away from the lower die or punch assembly to several inches away. This slot arrangement facilitates repair work of the turret and lower support structure because when the lower heating ring 28 is moved backward several inches, access to the lower structure is more readily possible. The supporting means 29 is mounted on posts 32. In order to render access to the interior of the machine even more easy, the posts on each side are of a simple snap-in removable-type support. When one or two of these supports are removed, the heater support ring is then held up by the other four or five supports shown in the figures. These four rearmost supports are fastened top and bottom so that elimination of any one support is not fatal to the function of the ring.

Figure 5:
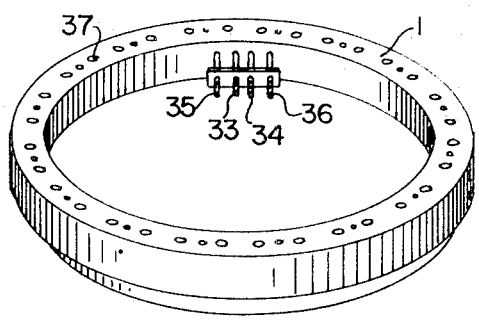
FIG. 5 shows an upper heater element.

The upper heating ring 1 is shown in perspective view in FIG. 5. Terminals for conducting electricity into and out of the heater ring 1 are connected so that the two pairs of inner terminals 33,34 connect to the resistors 19 shown at the inside of the ring. The two pairs of outer terminals 35, 36 connect to the outer resistors 20. As shown best in FIGS. 3 and 5, the electric terminals conduct electricity into the resistor elements 19,20 cast into the aluminum ring 1. The thermal rate of conductivity of aluminum is quite high. The aluminum heater ring 1 conducts heat from the resistors quite rapidly. Passages 37 shown in the heat ring pass completely through the ring to accommodate the shafts 38 of the molding elements (FIG. 3) shaft 38 is held in tension by a preloaded compression spring 48 which is mounted in spring cartridge 49. The heater elements 19,20 pass inside or outside of the passages 37.

Figure 6:
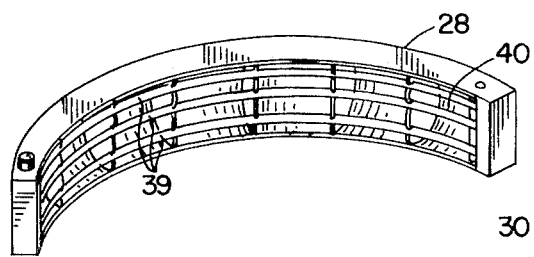
FIG. 6 shows a lower heater element.

A pair of lower heating elements 28 are mounted about the lower punch assembly 18. One of the two lower heaters 28 is shown in FIG. 6. Several resistor elements 39 conduct electricity and develop heat. Behind the resistor elements are heat reflectors 40 to divert any heat rays forward toward the lower assembly. While the heat radiated by these heater elements 28 is of considerable criticality in the forming of the plastic ring, it is not quite as critical as the amount of heat developed in the heater ring because the upper die or punch is in physical contact with the plastic ring and therefore, the heat imparted to the plastic or plastic disc 41 (FIG. 12) from the upper die or critical punch 26 is of more consequence to its forming.

Figure 7:
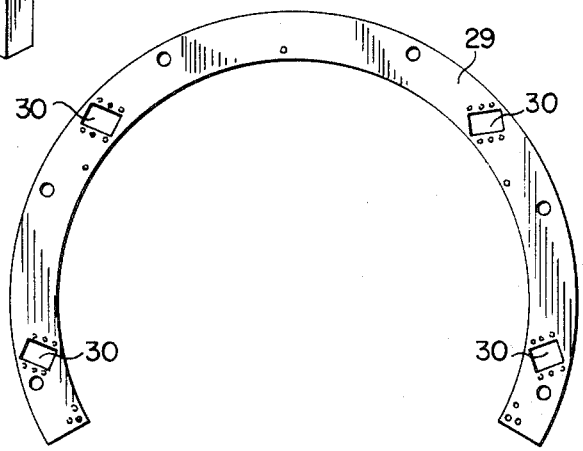
FIG. 7 shows a top view of the ring support member.

FIG. 7 shows the support ring 29 itself as it is seen without any fastenings. On the right and left are paired slots 30 for supporting the lower heating semicircular elements 28 so that these elements can be moved into and out of proximity with the lower heated die assembly 18. When the lower heater is moved forward in the slots, it is about one-sixteenth inch from the lower die assembly.

Figure 8:
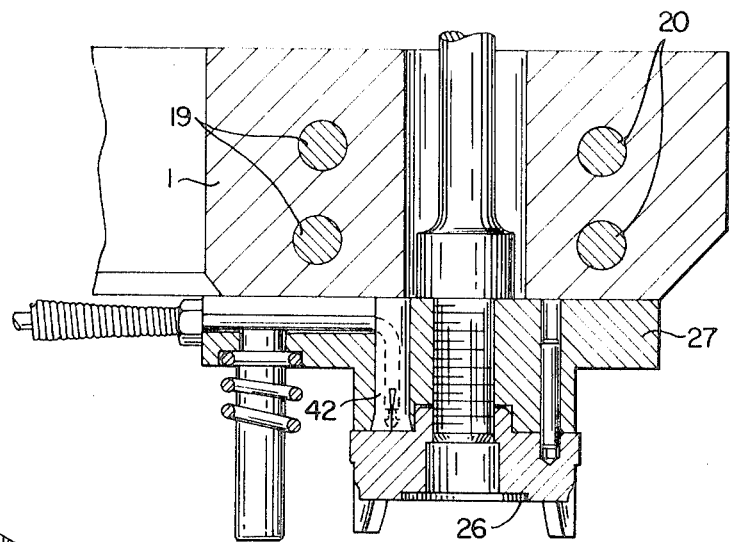
FIG. 8 is a sectional view of an upper clamp member at the thermal control station on the periphery of the turret.
Figure 9:
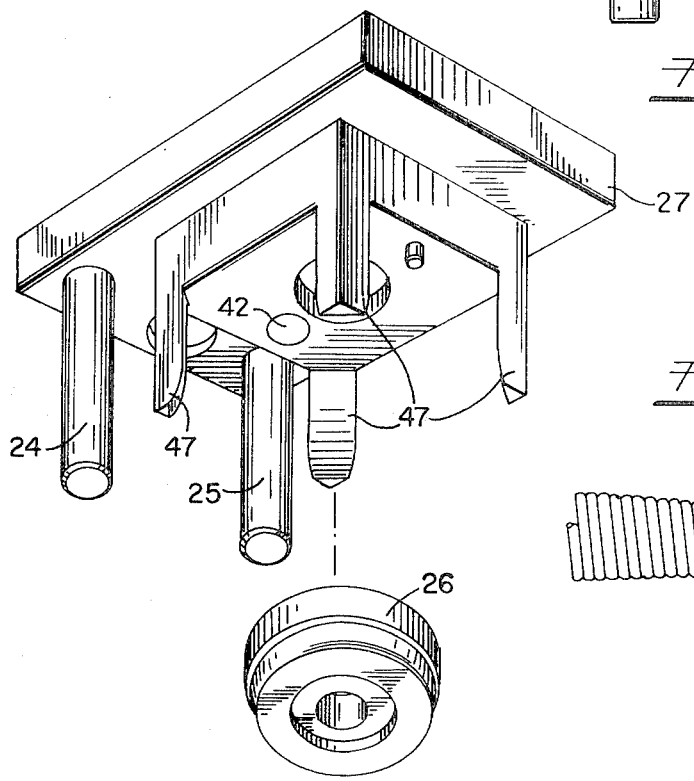
FIG. 9 is an exploded perspective view showing the upper molding die support plug and clamp member.

In an apparatus of this sort, the level of the temperature of the upper and lower dies is critical. If the temperature of the die is too high, the plastic inside the cap will burn and stick to the punch. If, on the other hand, the temperature of the die is not high enough, the plastic material will not flow to form the desired sealing contact all the way around the cap (FIGS. 11 and 12). A temperature range at which the plastic will work satisfactorily is on the order of 410° to 425° F. Some plastic materials may be cured in a broad range of temperatures, such as 300° to 500° F. In the usual factory operating conditions, a variety of influences play upon a machine. For example, it may be summer, winter, raining, high humidity, low humidity, or drafty. Each of these variable atmospheric conditions affects the rate at which heat flows from the machine and thus affects heat distribution through the machine. It is necessary for the heat to be at a very precise level of temperature at the point where the die 26 or punch forms the plastic in the cap. Since the various atmospheric effects play upon each station of the turret with approximately the same result at each station, a very good control can be accomplished by having one thermal control point at a single upper punch 26 on the periphery of the turret 2. Such a thermal control point is established at the station shown in cross section in FIG. 8. The heater ring 1 with its paired resistance elements is mounted to the top element 2 (FIG. 3) shown and below that and pressed into contact with it is the upper thermal transfer element 27 which forms a heat sink. Shown on the left-hand side of the upper thermal transfer element 27 is a plug 42 (FIG. 8) extending through the upper thermal transfer element. This plug is made of a material having a high thermal conductivity. A perspective view of the upper thermal transfer element 27, the punch 26, the thermal plug 42, and the locator pins 24, 25 shown in FIG. 9.

Figure 10:
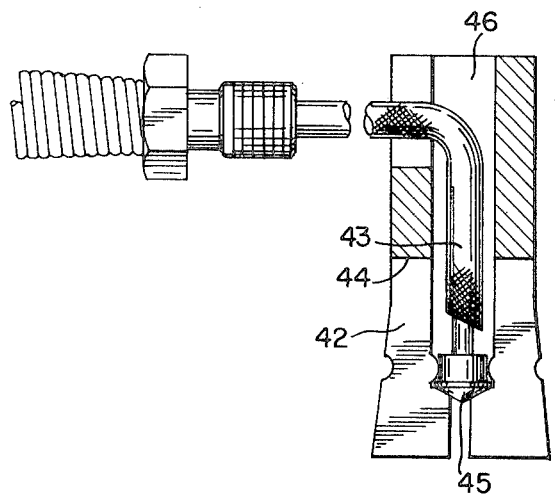
FIG. 10 shows the thermocouple tip and thermocouple support element.

The details of the thermal plug and the thermocouple combination are shown in FIG. 10. The plug 42 is shown before it is driven into the upper element 27 in FIG. 8.

While it is out of the assembly, the thermocouple 45 is pushed down into the plug 42 where it snaps into place. The plug has slits 44 almost half of its length in four perpendicular directions. This facilitates later crimping of the plug when it is forced into the upper thermal transfer element 27. When the thermal plug 43 has been driven into the thermal element, the thermocouple 45 is located fairly close to the die or punch 26. In this way, temperature gains or losses of the die or punch are reflected into the heater ring much more quickly than would be the case if the thermal plug was of a material which conducted heat slowly. The amount of heat added to the heater ring in order to bring the die or punch up to the given temperature is lessened. Thus heater plug 42 is a thermal connection between the heater ring and the die or punch so that the extent of the temperature swings of the die or punch are considerably lessened by means of the thermally conductive bridge formed by the thermal plug.

The method of forming the thermal plug with included thermocouple is of particular interest. The thermal plug 42 is made of a highly conductive material in the form of a cylindrical plug having a channel 46 through its center. The plug is flat at its ends and is slit 44 up one-third to one-half of the way, the slit being in the form of an "X." Once the thermocouple 45 is inserted into the thermal plug 42, the thermal plug may be pressed together so that the thermocouple element 45 is caught in the bottom of the thermal plug 42. When the thermal plug is shoved up into the upper thermal transfer element, it makes a tight fit which holds it in place.

The function of the upper heat transfer element 27 is twofold. It acts as a heat sink and also since it is made of a very strong material, the four locator pins 47 center the cap in a very precise position. If the material were made of other than steel or the like, a locator finger might bend, and this would result in an immediate malfunction of the machine. Further, this element is capable of being smoothed to a high degree and may have high contact pressure with the aluminum heater 1. Because of the density of the material in the heat sink and the slow rate at which heat flows through this material more heat is accumulated per cubic centimeter in the material of the heat sink than is in the aluminum heater ring. By means of having an intermediate heat sink, greater stability is assured to the temperature of the punch member. Since the heater ring may swing widely in temperature, the "buffer" heat sink protects the punch and consequently, the cap member from the temperature swings of the heater ring and insures a considerably greater stability to the plastic material and the punch which heats it.

While particular materials and specific details of construction have been referred to in describing the form of the machine illustrated, it will be understood that other suitable materials and equivalent structural details may be resorted to without departing from the spirit of the invention.

We claim:

1. An electrically heated compound molding machine for in-place molding of cap liners comprising:
    a liner curing turret mounted for rotation on a vertically disposed axis;
    clamp punch assemblies mounted on the turret for receiving caps having a predetermined quantity of thermally curable material therein;
    means for feeding the caps to successive clamp assemblies as the turret rotates about its axis;
    upper clamping members of said assemblies being mounted in fixed position on the periphery of said turret and having a die element adapted to fit snugly into said cap to shape the thermally curable material in said cap into a liner disc on the cap bottom and cap skirt when the clamping members are closed together;
    first heating means having a thermal capacity much less than said upper clamping members and mounted adjacent said upper clamping members and between said clamping members and said turret for imparting heat by direct conduction to each said upper clamping member whereby each said upper clamping member acts as a heat equalizing means between said heating means and said die element;
    lower clamping members mounted for vertical reciprocation in a bore in a support member whereby operating means causes vertical reciprocation of said lower member to open and close the clamping members for receiving and discharging the caps;
    second heating means mounted near said lower clamping member and extending almost around said turret and said clamp assemblies for imparting heat to said lower clamping member; and
    thermal control means having a heat sensitive element for intermittently sending current to said first and second heating means whereby said upper and lower clamping members are maintained at a temperature near the curing temperature of said thermally curable material.

2. An electrically heated compound molding machine for in-place molding of cap liners as set forth in claim 1 in which said first heating means comprises:
    a ring-shaped member made of material having higher thermal conductivity and lower specific heat than said upper clamping member and said die element;
    resistance elements embedded in said ring-shaped member; and terminal elements connected to said resistance elements whereby electricity is conducted to and from said resistance elements.

3. An electrically heated compound machine for in-place molding of cap liners as set forth in claim 1 in which said upper clamping member comprises:
    an upper thermal transfer element having higher specific heat than said first heating means and mounted adjacent to and in close contact with said first heating means whereby heat is transferred by conduction from said heating means to said thermal transfer means; and
    said die element being mounted adjacent to and in close contact with said upper thermal transfer element whereby heat may be transferred between said upper thermal transfer element and said die element.

4. An electrically heated compound molding machine for in-place molding of cap liners as set forth in claim 3 in which said upper thermal transfer element comprises:
    a base member having four locator pins extending downwardly from said base member for centering a cap on said lower clamping member.

5. An electrically heated compound molding machine for in-place molding of cap liners as set forth in claim 3 in which said thermal control means for said first heating means comprises:
    a thermal plug made of a material having high thermal conductivity and fitting snugly into a passageway extending through said upper thermal transfer element between said die element and said first heating means;
    a heat-sensitive element in said plug for determining the temperature of a part of said plug; and
    electrically conductive leads extending from said heat-sensitive element for conducting electrical information as to temperature level from said heat sensitive element whereby the amount of heat generated in said first heating means is controlled by the temperature of said heat-sensitive element.

6. An electrically heated compound molding machine for in-place molding of cap liners as set forth in claim 5 and having, additionally,
    ring support means for suspending said second heating means; and
    removable support elements attached to said support ring for maintaining said support ring in position.

7. An electrically heated compound molding machine for in-place molding of cap liners as set forth in claim 5 in which:
    said heat-sensitive element in said plug is located near said die element.

8. An electrically heated compound molding machine for in-place molding of cap liners as set forth in claim 6 in which said support ring means comprises:
    a flat sector of over half a circle having slots therein; and
    connecting means mounted in said slots for supporting said second heater means whereby said second heater may be slid from a position near said lower clamping members to a position remote from said lower clamping members.

9. An electrically heated compound molding machine for in-place molding of cap liners as set forth in claim 1 in which said second heating means comprises:
    an arcuate heater element mounted around said lower clamping members for imparting heat to said lower clamping members and having
    resistance heating means extending along the length of said arcuate heater element; and
    reflector means extending along the length of said resistance heating means and mounted on the opposite side of said resistance heating means from said lower clamping members whereby heat given off by said resistance heating means is reflected by said reflector means toward said lower clamping means.

10. An electrically heated compound molding machine for in-place molding of cap liners as set forth in claim 1 in which:
    a bolt having a compression spring mounted under its head is threaded into said die and the compression spring under its head rests against the upper part of said turret for fixedly mounting said die and upper clamping means on said turret.

* * * * *